United States Patent
Gutshall

[15] 3,643,543
[45] Feb. 22, 1972

[54] MACHINE SCREW
[72] Inventor: Charles E. Gutshall, Ellwood City, Pa.
[73] Assignee: Textron, Inc., Providence, R.I.
[22] Filed: Sept. 4, 1970
[21] Appl. No.: 69,771

[52] U.S. Cl. ..................................................85/46
[51] Int. Cl. ..........................F16b 25/00, F16b 35/00
[58] Field of Search ..................85/46, 41, 48; 151/22; 10/10 R; 285/334 R

[56] References Cited

UNITED STATES PATENTS

| | | | |
|---|---|---|---|
| 2,242,758 | 5/1941 | Ruggieri | 85/46 |
| 2,869,224 | 1/1959 | Forster | 85/46 X |
| 3,133,578 | 5/1964 | Moskovitz | 151/22 |
| 3,156,152 | 11/1964 | Reed | 85/41 |
| 3,364,807 | 1/1968 | Holton | 85/46 X |
| 3,426,820 | 2/1969 | Phipard | 151/22 |

*Primary Examiner*—Ramon S. Britts
*Attorney*—Webb, Burden, Robinson & Webb

[57] ABSTRACT

A coarse machine screw which terminates in a gimlet point has a plurality of threads adjacent to the point end which have an included angle substantially greater than the standard included angle. In the preferred embodiment, two thread forms are employed, the thread form adjacent the point end having an included angle of about 90° and the standard thread form, i.e. 60°, comprising the balance of the threads.

4 Claims, 2 Drawing Figures

PATENTED FEB 22 1972

3,643,543

INVENTOR.
Charles E. Gutshall
BY Webb Burlew Robinson
& Webb
HIS ATTORNEYS

MACHINE SCREW

This invention relates to fasteners and, more particularly, to screws having coarse machine threads.

The manufacture of coarse machine screw threads terminating in a full gimlet point has presented numerous problems for the fastener industry. The roll thread dies employed to form the coarse threads routinely break out at the intersection between the shank and the point. In addition, the blank configuration is difficult to maintain and, of course, the tolerance both as to finish length and thread design are critical.

My thread design minimizes thread die breakout by substantially increasing the strength of the threads adjacent the point, while at the same time maintaining the basic path described by thread crests as they taper in diameter to the gimlet point. Further, by altering the thread design adjacent the point area, my screw threads are better adapted to correct misalignments of the fastener into a threaded hole.

My coarse machine screw threads have an included angle substantially greater than standard, for example, about 90°, at least along the threads adjacent the point. The balance of the threads can be standard, that is, about 60° or the actual crest angle in every case can be 60° with the flank portion of the threads forming roots, the angle of which is 90°.

Figure 1:
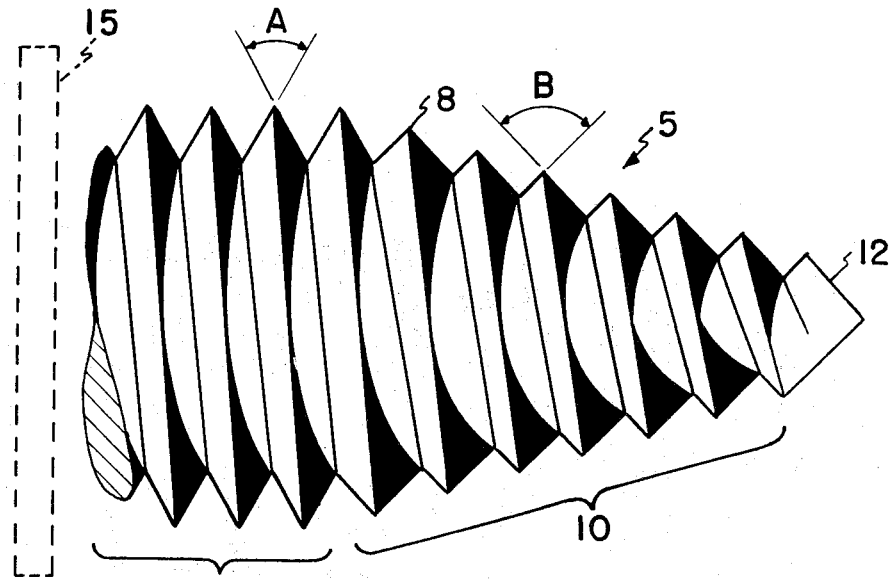
Figure 2:
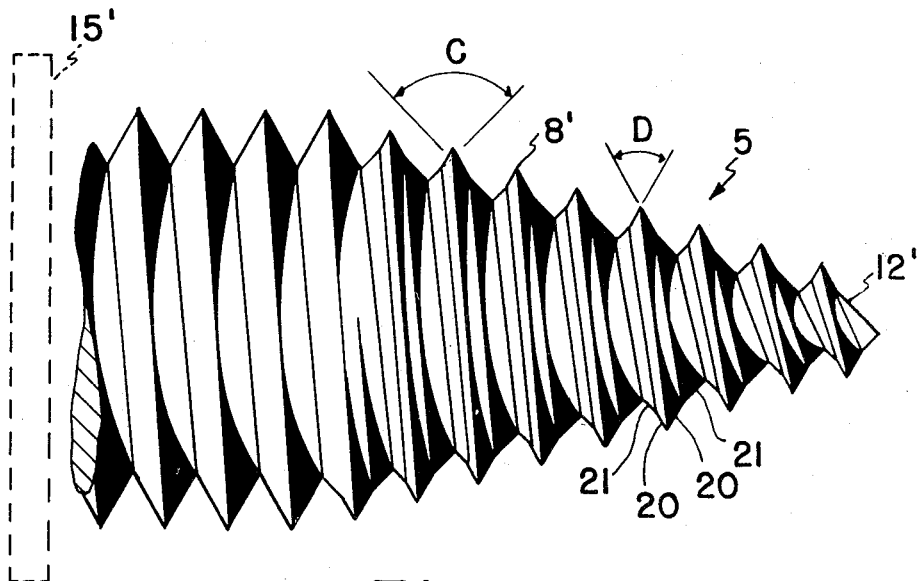

In the accompanying drawings, I have shown my presently preferred embodiments in which:

FIG. 1 is an elevation of my machine screw having two distinct thread forms; and FIG. 2 is my machine screw having modified roots and flanks to define an included angle substantially greater than standard.

My invention has primary applicability to machine screws having a coarse thread and terminating in a gimlet point, which is generally hardened by known techniques. In FIG. 1, I have shown such a coarse machine screw having two distinct thread forms. The machine screw, generally designated 5, includes a threaded shaft 8, a gimlet point 12 and a fastener head 15. The fastener head 15 can be any of the well known head designs known in the art, and as such, is merely shown in nondescript form. The threads 10 of the threaded shaft 8 adjacent the gimlet point 12 have an included angle substantially greater than the standard angle. This included angle is shown as 90° in FIG. 1 and is depicted and designated B. The balance of the threads, or the second thread form 11 represents threads having standard included angles of 60° and which are depicted and designated at A. In other words, the included angle of the thread form 10 adjacent the gimlet point 12 is substantially greater than the included angle of the thread form 11 which represents the balance of the threads. It is not essential that this increased included angle be 90°, but 90° permits for ease of manufacture and tolerance control.

It should be noted that the taper of the screw is standard and that the only difference in the screw threads is that the flanks and roots have been altered on the threads adjacent the point 12 to obtain the substantially increased included angle shown at B. In other words, screw 5 is helically, diametrically and axially identical with a standard machine screw and differs only in flank and root configuration.

The same improvements can be obtained by using a more complex thread form as shown in FIG. 2. The screw 5 of FIG. 2 includes a threaded shaft 8', a gimlet point 12' and a standard fastener head 15'. The actual angle at the crest angle, shown at D, of each thread remains standard, that is, 60°, but the included angle shown as C is substantially greater and is again shown at about 90°. This included angle C is defined by the extension of the intersecting sections of the flanks of adjacent threads. As shown in FIG. 2, each flank is formed of two intersecting surfaces 20 and 21. The substantially increased included angle is formed by the extension of surfaces 21 for each thread. The advantage of this embodiment is that the actual crests themselves represent an angle of standard dimension, namely, 60°, whereas the included angle is substantially greater, for example 90°, and, therefore, the thread is substantially strengthened to avoid breakout during forming.

Because of the increased included angle of both embodiments, these threads more readily correct any misalignments resulting from inserting such a machine screw improperly into a threaded hole. In addition, because of the greater included angle, there is less of a change for unfilled threads caused from minor blanking errors.

While I have shown and described preferred embodiments of my invention, it may be otherwise embodied within the scope of the appended claims.

I claim:

1. A coarse machine screw terminating in a gimlet point and having a threaded shaft including a portion having a standard included angle of 60° and in which at least the threads adjacent the entry end of the screw have an included angle substantially greater than the standard included angle and wherein the angle at the crest of each thread is 60°

2. A coarse machine screw terminating in a gimlet point having a threaded shaft which includes two distinct thread forms, the threads adjacent the gimlet point forming the first thread form and having an included angle of approximately 90° and the balance of the threads forming the second thread form and having a standard angle of 60°.

3. The coarse machine screw of claim 2 wherein each flank of each thread of the first thread form comprises two intersecting surfaces.

4. The coarse machine screw of claim 3 wherein the intersecting flank surfaces of adjacent threads form the included angle of approximately 90°.

* * * * *